United States Patent
Spohrer et al.

(10) Patent No.: US 12,246,674 B2
(45) Date of Patent: Mar. 11, 2025

(54) METHOD FOR LOCKING AND RELEASING A SECURING DEVICE OF A VEHICLE COUPLING, THEFT PREVENTION SYSTEM, AND VEHICLE

(71) Applicant: Daimler Truck AG, Leinfelden-Echterdingen (DE)

(72) Inventors: Nicolai Spohrer, Leinfelden-Echterdingen (DE); Marco Busch, Leinfelden-Echterdingen (DE); Sebastian Dingler, Leinfelden-Echterdingen (DE); Stefan Heyer, Leinfelden-Echterdingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 37 days.

(21) Appl. No.: 18/546,215

(22) PCT Filed: Jan. 28, 2022

(86) PCT No.: PCT/EP2022/052081
§ 371 (c)(1),
(2) Date: Aug. 11, 2023

(87) PCT Pub. No.: WO2022/171461
PCT Pub. Date: Aug. 18, 2022

(65) Prior Publication Data
US 2024/0116474 A1    Apr. 11, 2024

(30) Foreign Application Priority Data
Feb. 12, 2021    (DE) .................... 10 2021 000 727.1

(51) Int. Cl.
*B60R 25/23*    (2013.01)
*B60R 25/24*    (2013.01)
(Continued)

(52) U.S. Cl.
CPC .............. *B60R 25/24* (2013.01); *B60R 25/23* (2013.01); *B60R 25/25* (2013.01); *B60R 25/305* (2013.01);
(Continued)

(58) Field of Classification Search
CPC ....... B60R 25/24; B60R 25/25; B60R 25/305; B62D 53/085
See application file for complete search history.

(56) References Cited

U.S. PATENT DOCUMENTS 8,615,347 B2    12/2013  Gallego et al.
2003/0097218 A1    5/2003  Borugian
(Continued)

FOREIGN PATENT DOCUMENTS

DE    10 2004 051 760 A1    4/2006
DE    10 2008 011 835 B4    9/2009
(Continued)

OTHER PUBLICATIONS

International Preliminary Report on Patentability (PCT/IB/373) and German-language Written Opinion (PCT/ISA/237) issued in PCT Application No. PCT/EP2022/052081 dated Aug. 15, 2023, with English translation (19 pages).
(Continued)

*Primary Examiner* — Nabil H Syed
(74) *Attorney, Agent, or Firm* — Crowell & Moring LLP

(57) ABSTRACT

A method for locking and releasing a securing device of a vehicle coupling of a vehicle includes switching the securing device between a locked state and a released state by a control command output by an authorization unit where the authorization unit outputs the control command after receiving an initiation command transmitted to the authorization unit by an interface and where a wireless communication interface and a local physical interface are useable as the
(Continued)

interface. Sensor data, generated by a sensor that monitors surroundings of the vehicle, is transmitted via the wireless communication interface to a control center. The initiation command is transmitted to the vehicle by the control center via the wireless communication interface as a function of the sensor data. When there is no communication connection between the control center and the vehicle, it is only possible to output the initiation command via the local physical interface.

10 Claims, 1 Drawing Sheet

(51) Int. Cl.
  *B60R 25/25*  (2013.01)
  *B60R 25/30*  (2013.01)
  *B62D 53/08*  (2006.01)
  *B60W 60/00*  (2020.01)

(52) U.S. Cl.
  CPC ...... *B62D 53/085* (2013.01); *B60R 2325/101* (2013.01); *B60R 2325/103* (2013.01); *B60R 2325/105* (2013.01); *B60W 60/00* (2020.02)

(56) References Cited

U.S. PATENT DOCUMENTS

| 2004/0145150 | A1* | 7/2004 | Yeakel | B62D 53/12 |
| | | | | 280/433 |
| 2019/0302764 | A1* | 10/2019 | Smith | G05D 1/0088 |
| 2022/0212627 | A1* | 7/2022 | Nilsson | B60R 25/24 |

FOREIGN PATENT DOCUMENTS

| DE | 20 2018 105 663 U1 | 11/2018 | |
| EP | 2 189 307 A1 | 5/2010 | |
| WO | WO 01/44030 A2 | 6/2001 | |
| WO | WO-2013041108 A1 * | 3/2013 | ........... B62D 53/085 |

OTHER PUBLICATIONS

PCT/EP2022/052081, International Search Report dated May 18, 2022 (Four (4) pages).

German-language German Office Action issued in German application No. 10 2021 000 727.1 dated Jul. 5, 2021 (Six (6) pages).

* cited by examiner

METHOD FOR LOCKING AND RELEASING A SECURING DEVICE OF A VEHICLE COUPLING, THEFT PREVENTION SYSTEM, AND VEHICLE

BACKGROUND AND SUMMARY OF THE INVENTION

The invention relates to a method for locking and releasing a securing device of a vehicle coupling, to a theft prevention system for preventing an unauthorized removal of a trailer connected via a vehicle coupling to a vehicle, and to a vehicle having such a theft prevention system.

Commercial vehicles are typically used to transport heavy and/or bulky goods. These usually consist of a towing vehicle and one or more trailers or semi-trailers pulled by the towing vehicle. The provision of a tractor unit that can be separated from the semi-trailer enables merchandise to be transported in a versatile manner. In this way, the semi-trailer of the tractor unit can be changed at will, for example in order to be able to quickly connect an already loaded semi-trailer to a free tractor unit, as a result of which lead times can be reduced. The tractor unit and semi-trailer are connected via a vehicle coupling, which in the case of lorries is also referred to as a fifth-wheel coupling. In the coupled state, the semi-trailer rests on a fifth-wheel plate of the tractor unit. If the semi-trailer is to be removed from the tractor unit later on, the fifth-wheel coupling must usually be unlocked via an unlocking operation, so that the tractor unit can then be removed from the semi-trailer by driving forwards.

When transporting goods and merchandise with a lorry, a semi-trailer of the tractor-trailer combination could potentially be stolen. This is done by opening the vehicle coupling between tractor unit and semi-trailer and separating the semi-trailer from the tractor unit. The semi-trailer can also be pushed backwards to remove it from the tractor unit. To prevent such a theft, the vehicle coupling can be locked with the aid of a mechanical device so that the coupling can only be opened by an authorized person.

Such a theft prevention device for a vehicle coupling is known for example from DE 10 2008 011 835 B4. The theft prevention device disclosed in that publication makes it possible to reliably separate a semi-trailer from its corresponding tractor unit in an emergency situation, for example in the event of damage to the tractor-trailer combination. For this purpose, an opening state of the vehicle coupling is controlled by a control apparatus. The control apparatus receives sensor data from a vehicle system, which can be used to infer damage. The sensor data comprises in particular data from an ABS, an acceleration sensor, a crash sensor, a deployment state of an airbag and/or a state of a restraint system such as a seatbelt tensioner. If the tractor-trailer combination is damaged, the control apparatus releases the vehicle coupling so that, for example, support personnel can separate the semi-trailer from the tractor unit. According to one embodiment of the theft prevention device, it may be necessary to additionally have to input a code into a code input device in order to open the vehicle coupling. In this way, in the event of damage, an undesired separation of the semi-trailer from the tractor unit can be prevented in that only authorized persons who have the code can bring about opening of the vehicle coupling. This code can also be input into the code input device wirelessly via an external device, for example also via the Internet.

Furthermore, a sensor assembly for monitoring a coupling state of a vehicle coupling between a semi-trailer and a tractor unit is known from EP 2 189 307 A1. The sensor assembly comprises a contactless sensor, in particular a Hall effect sensor, or an inductive sensor, with the aid of which it can be checked whether the semi-trailer is correctly coupled onto the tractor unit. In the coupled state, the semi-trailer is locked using a mechanical device in the tractor unit so that the semi-trailer cannot unintentionally detach from the tractor unit during transport.

A method for remotely locking a fifth-wheel coupling of a vehicle is known from US 2004/0145150 A1. Depending on the whereabouts of the vehicle, the fifth-wheel coupling can be operated by a vehicle-external control center, whereby the vehicle determines its whereabouts by means of GPS. The vehicle can also receive radio signals from a transmitter and independently operate the fifth-wheel coupling by an onboard system in accordance with a transmitter that is within range.

A radio-controlled locking unit and a device for opening or closing a lock with such a radio-controlled locking unit are known from DE 20 2018 105 663 U1. This radio-controlled locking unit can also be integrated into a vehicle and receive lock control requests by means of a mobile communication unit and/or a central control server.

The rise in digitization goes hand in hand with the increasing degree of automation of vehicles. Thus, in the future, autonomously operated lorries will also be used for transporting goods and merchandise. In the case of such an autonomously operated tractor unit, there is no authorized person in situ who can release the vehicle coupling in order to be able to detach a semi-trailer from its corresponding tractor unit. However, depending on the situation, a deliberate connection and release of the semi-trailer to and from the tractor unit is necessary. Thus, for example, it is necessary to release the vehicle coupling when the tractor-trailer combination arrives at a so-called motorway hub, also known as a depot, in order to reload merchandise and/or goods or to prepare a tractor unit for its next job. Furthermore, unintentional opening of the vehicle coupling should be prevented, for example, when the tractor-trailer combination stops at a petrol station. A method and a device by means of which a vehicle coupling of a tractor-trailer combination can also be operated and monitored remotely are therefore desirable.

The present invention is based on the object of specifying a method for locking and releasing a securing device of a vehicle coupling of a vehicle, which method enables a particularly reliable and safe operation of an autonomous vehicle combination.

In a method for locking and releasing a securing device of a vehicle coupling of a vehicle of the type specified in the introduction, a wireless communication interface and a local physical interface are used as an interface. Furthermore, the vehicle according to the invention can be controlled autonomously and uses sensors to monitor its surroundings, with at least one camera and one microphone being used as sensors, and transmits sensor data generated at least by one sensor via the wireless communication interface to a control center, wherein the control center transmits the initiation command to the vehicle via the wireless communication interface as a function of the sensor data. If there is no communication connection between vehicle and control center, it is then only possible to output the initiation command by way of the local physical interface.

A particularly reliable and safe operation of a vehicle combination is possible with the aid of the method according to the invention. Using the sensor data, the control center checks a current situation, whereupon the control center releases the vehicle coupling if this is necessary, and leaves the securing device and thus the vehicle coupling in its locked state if the situation prohibits a release of the vehicle coupling, for example because third parties want to steal a trailer or semi-trailer connected to the vehicle via the vehicle coupling. Communication between vehicle and control center takes place via proven wireless communication mechanisms such as mobile telephony, radio waves, Wi-Fi or the like. By virtue of control center evaluating the sensor data, it is possible to react to unforeseen situations in a flexible manner. If an unplanned release of the trailer from the vehicle becomes necessary, for example during a police check or in the event of a breakdown, a reliable release of the vehicle coupling and thus release of the trailer from the vehicle is also possible in such a case, even if no authorized person, for example a driver of the vehicle, is present to release the vehicle coupling.

By evaluating camera images, a current situation can be comprehensively analyzed and assessed. Thus, for example, the whereabouts of the vehicle at a petrol station or the arrival of the vehicle at a hub can be detected by evaluating the camera images. With the aid of the microphone, it is also possible to lock or release the vehicle coupling at a desired point in time. For example, a hub employee or—during a police check—a police officer can make a corresponding request to lock or release the vehicle coupling, which is then promptly implemented.

The control center is able to evaluate the sensor data in a variety of ways. The evaluation can, for example, take place manually or also in an automated manner, for example by an automated computer system.

One advantageous development of the method provides that at least one of the following further sensors generates sensor data:
  a radar;
  a sensor for determining the whereabouts of the vehicle;
  a lidar; and/or
  an ultrasound sensor.

It is possible to monitor the surroundings comprehensively using the sensors listed above. The sensor for determining the whereabouts of the vehicle can be, for example, a receiver of a global satellite navigation system such as GPS or Galileo. By comparing a geoposition of the vehicle identified using this receiver with map data, it can be determined whether the vehicle is on a planned route or at a destination. If the vehicle stops, for example, at a petrol station for a planned refuelling, the securing device and thus also the vehicle coupling remain in their locked state. If, by contrast, the vehicle arrives at a hub, for example, then reliable releasing of the vehicle coupling is ensured.

According to a further advantageous embodiment of the method, the local physical interface outputs the initiation command if the local physical interface detects at least one of the following authorized actions:
  reading an authorized RFID tag;
  reading an authorized optoelectronic code;
  scanning an authorized biometric feature;
  inputting an authorized sequence of numbers and/or letters into an input device of the local physical interface; and/or
  receiving a wireless signal, in particular a signal transmitted via NFC, Wi-Fi, Bluetooth and/or infrared.

By virtue of the local physical interface, flexibility in terms of locking or releasing the vehicle coupling can be increased and/or the risk of the vehicle coupling being opened in an undesired way can be reduced. Thus, the local physical interface represents a backup solution for releasing the securing device and thus the vehicle coupling. Thus, for example, the vehicle may be in a dead zone in a situation in which it is necessary to release the vehicle coupling. In this case, communication between control center and vehicle is not possible. In order, nevertheless, to bring about the release of the vehicle coupling, the initiation command can then also be output solely by the local physical interface and transmitted to the authorization unit.

The local physical interface can be designed, for example, as a reader for reading RFID tags, have a reader such as a camera or a laser scanner for reading optoelectronic codes such as barcodes and/or QR codes, have a scanner for capturing biometric features, in particular for performing a facial recognition scan or an iris scan, or for acquiring fingerprints and/or performing voice analysis. The local physical interface can also have an input device for inputting sequences of numbers and/or letters, for example a keypad and/or in the form of a touchscreen. The local physical interface can also detect wireless signals such as a release code sent via NFC, Wi-Fi, Bluetooth and/or infrared. It is also conceivable that the local physical interface combines a plurality of the aforementioned embodiments and at least two of the different authorized actions must be detected for outputting the initiation command. For example, a hub employee may be required to scan their employee pass, for example a chipcard, and then input a numerical code to release the vehicle coupling. Also, to output the initiation command via the local physical interface, a person authorized to release the securing device may authenticate their identity with the aid of a mobile device such as a smartwatch, a smartphone, a tablet computer, a laptop or the like.

The local physical interface can be located at any position in the vehicle. For example, it can be in the interior of a driver's cab in a tractor unit or also, for comparative ease of access, outside the tractor unit, for example in the area of a cab access ladder or in the area of the vehicle coupling. In general, the local physical interface can also have a plurality of terminals for inputting or authenticating persons, for example a terminal in the cab and a terminal outside of the cab.

According to a further advantageous embodiment of the method, a state of the securing device is transmitted to the control center at least one predetermined point in time. For example, the state of the securing device is transmitted to the control center once a trailer or semi-trailer has been connected to the vehicle or the combination of vehicle and trailer arrives at a destination, for example a hub. It can thus also be checked whether a hub employee has forgotten to lock the vehicle coupling. This can improve road safety, since accidental release of the trailer from the vehicle can thus be prevented. It can also be used to verify whether the vehicle coupling is open in order to separate vehicle and trailer. In addition to detecting the state of the securing device, a coupling state of the trailer to the vehicle can also be detected and monitored. This can be done analogously to the prior art by contact-based and/or contactless sensors in the vehicle coupling. The state of the vehicle coupling as well as of the securing device can also be detected and monitored at any number of arbitrary points in time, thus also continuously. In particular, a corresponding signal is transmitted to the control center, as a result of which the connection of the trailer to the vehicle and a locking of the connection to prevent unauthorized removal of the trailer can be checked at any time.

The control center is preferably a vehicle control center, in particular a vehicle control center for controlling autonomous lorries. This vehicle control center can also control the autonomously operated lorries. In this way, jobs can be assigned to the lorries and/or assigned jobs can be changed. Furthermore, it is thus possible to intervene spontaneously in the operation of an autonomously operated lorry, for example in an extraordinary case such as a police check. In the process, the vehicle control center also verifies whether goods and/or merchandise transported by a lorry have been delivered to a correct destination. If this is the case, the vehicle control center can transmit a command to the vehicle to release the vehicle coupling.

Remote monitoring also has the advantage that, in the case of an autonomously operated lorry, there is no driver who can be forced to release a vehicle coupling lock secured by the securing device, for example if threatened with the use of force.

Communication with the vehicle control center can be effected via Wi-Fi, particularly if an autonomously operated lorry is located in a hub.

In a theft prevention system for preventing an unauthorized removal of a trailer connected via a vehicle coupling to an autonomously controllable vehicle having at least one vehicle coupling, at least one securing unit, at least one authorization unit, at least one sensor and at least one interface, according to the invention the at least one interface comprises a wireless communication interface and a local physical interface. The theft prevention system has at least one camera and one microphone as sensors. Furthermore, the authorization unit is configured to implement an above-described method. The vehicle coupling can be designed in particular as a fifth-wheel coupling. The securing unit is any device which is capable of locking a trailer connected to the vehicle via the vehicle coupling in a position coupled into the vehicle coupling. For example, for this purpose a locking pin that is comparatively difficult to access can be inserted into an opening in the fifth-wheel coupling that is aligned when a semi-trailer is received in a fifth-wheel coupling. To operate such a mechanical securing device, it can, for example, be operated magnetically, hydraulically and/or pneumatically. The authorization unit can be formed by a separate computing unit or can, for example, be integrated into a central onboard computer. The authorization unit can also be integrated into a control unit of a vehicle subsystem. In particular, the authorization unit, the communication interface and/or the local physical interface can be formed by a common unit. A display and/or an operating device for inputting operating instructions can additionally be provided in order to output a current state of the securing device and/or the vehicle coupling. The display and/or the operating device can advantageously be located in the driver's cab of the vehicle. The display can also be integrated into the operating device. The operating device can furthermore form a terminal of the local physical interface, for example to input a numerical and/or alphabetic code for outputting the initiation command. The state information of the securing device and/or of the vehicle coupling can also be output acoustically, for example via at least one loudspeaker.

According to the invention, an autonomously controllable vehicle comprises such a theft prevention system. In other words, the vehicle uses the theft prevention system according to the invention in order to comfortably and reliably remotely monitor and control the state of a securing device of a vehicle coupling of a vehicle and/or the state of the vehicle coupling.

The vehicle can be a tractor unit, in particular the vehicle can be implemented as a lorry. In general, however, the vehicle can be any type of vehicle such as a car, a bus, a van, a flatbed lorry or the like.

The autonomously operated vehicle can preferably be controlled by a vehicle control center. The vehicle according to the invention thus permits a flexible, reliable and safe operation of autonomously operated lorries. For instance, it is easily possible to couple and uncouple trailers or semi-trailers to and from the autonomously operated lorries in a hub. For example, an autonomously operated tractor unit can be connected to semi-trailers belonging to different customers or to third-party semi-trailers in a flexible manner. In addition, access rights can be adjusted quickly and flexibly.

Further advantageous embodiments of the method according to the invention for locking and releasing a securing device of a vehicle coupling of a vehicle and of the theft prevention system according to the invention can be found in the exemplary embodiments described in more detail below with reference to the figures.

DETAILED DESCRIPTION OF THE DRAWINGS

Figure 1:
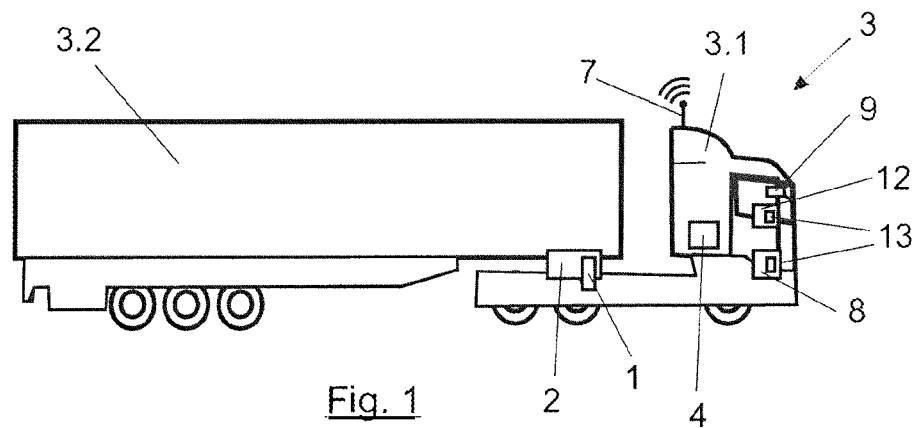
FIG. 1 is a side view of a vehicle according to the invention.
Figure 3:
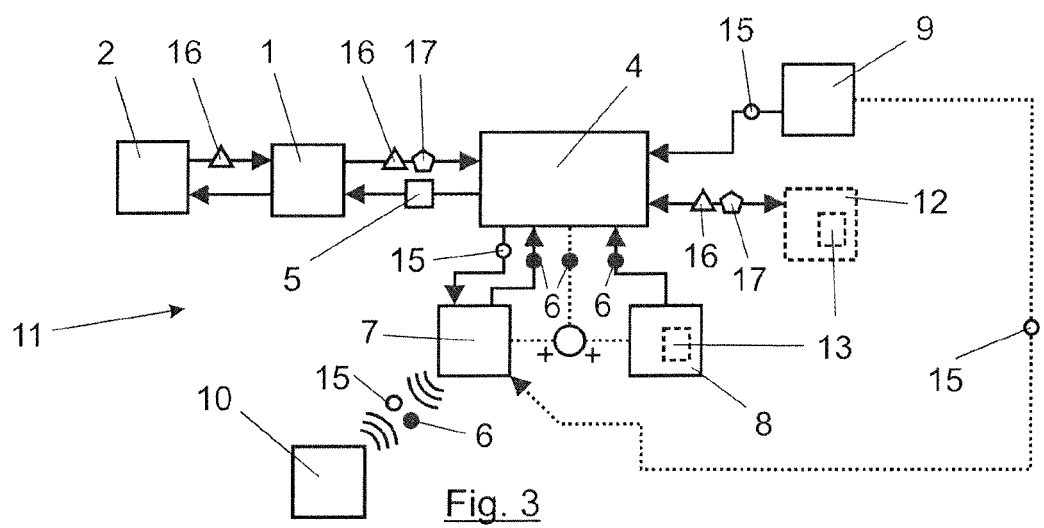
FIG. 3 is a schematic depiction of a theft prevention system according to the invention.

FIG. 1 shows a side view of an autonomously controllable vehicle 3 according to the invention, here in the form of a lorry. The lorry is a combination made up of a tractor unit 3.1 and a trailer 3.2 connected to the tractor unit 3.1 via a vehicle coupling 2. The vehicle coupling 2 in this case is a fifth-wheel coupling. So that the trailer 3.2 does not detach from the tractor unit 3.1 during transport with the latter, each half of the coupling made up of the tractor unit 3.1 and of the trailer 3.2 respectively are securely connected to each other. In order to prevent unintentional opening of the vehicle coupling 2, an engaged vehicle coupling 2 is secured against unintentional opening of the vehicle coupling 2 by way of an additional securing device 1. This prevents, for example, an undesired release of the trailer 3.2 from the tractor unit 3.1 and theft of the trailer 3.2. In order to be able to open the vehicle coupling 2, is it necessary to release the securing device 1 beforehand. For this purpose, the securing device 1 receives a control command 5, which is shown in FIG. 3 and which is output by an authorization unit 4. So that the authorization unit 4 can output the control command 5, the authorization unit 4 receives an initiation command 6, likewise shown in FIG. 3. The initiation command 6 can be output by a wireless communication interface 7 and/or a local physical interface 8. If communication via the communication interface 7 is not possible, then only the local physical interface 8 can output the initiation command 6.

The authorization unit 4 can be formed by a separate computing unit, or integrated into a central computing unit of the vehicle 3 or a control unit of a vehicle subsystem of the vehicle 3. The authorization unit 4, the wireless communication interface 7 and/or the local physical interface 8 can also be formed by a common unit. Furthermore, the vehicle 3 can have a display 13 on which a current status of the vehicle coupling 2 and/or of the securing device 1 can be displayed. The display 13 can also be comprised by an operating device 12, as depicted in FIG. 1. The operating device 12 can also be a constituent part of or form the local physical interface 8. For example, a code can be input via the operating device 12, which code is forwarded to the authorization unit 4 so that the latter outputs the control command to release the securing device 1 to release the vehicle coupling 2.

The vehicle 3 also comprises at least one camera and one microphone as well as optionally at least one further sensor 9, wherein a camera is depicted in FIG. 1 as sensor 9. The sensor 9 can also additionally or alternatively be in the form of one or more further microphones, radar sensors, a lidar, an ultrasound sensor and/or a sensor for determining the whereabouts of the vehicle 3. The sensor(s) 9 generate(s) sensor data 15, depicted in FIG. 3, which is transmitted via the wireless communication interface 7 to a control center 10, likewise depicted in FIG. 3. As a function of the sensor data 15, the control center 10 then forwards the initiation command 6 via the wireless communication interface 7 to the authorization unit 4 to output the control command 5.

Figure 2:
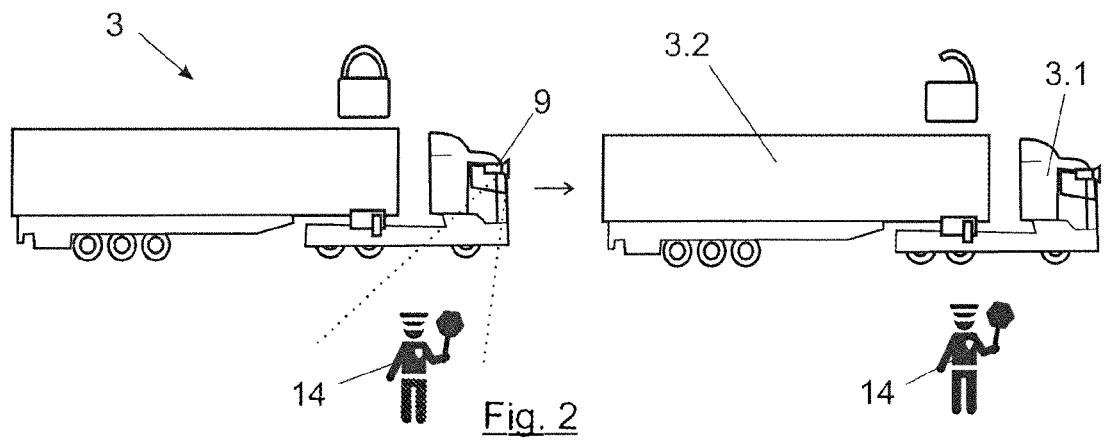
FIG. 2 is a basic illustration of a procedure for releasing a securing device of a vehicle coupling of the vehicle from FIG. 1.

FIG. 2 shows a basic illustration of a procedure for releasing the securing device 1 of the vehicle coupling 2 of the vehicle 3. In the left-hand half of FIG. 2, the vehicle 3 arrives at a police check. The police check requests that the trailer 3.2 be detached from the tractor unit 3.1. In order to be able to open the vehicle coupling 2, the securing device 1 first has to be released. For this purpose, a police officer 14 is detected by the sensors 9, for example a camera of the vehicle 3. The police office 14 can also issue an appropriate visual and/or acoustic signal to confirm that they are authorized to release the securing device 1. The police officer can, for instance, request that an operator of the vehicle 3 releases the trailer 3.2. The control center 10 can then decide to transmit the initiation command 6 to the vehicle 3 to output the control command 5 to release the securing device 1. This is shown in the right-hand half of FIG. 2.

It may sometimes be the case that there is no communication connection between vehicle 3 and control center 10, for example because the vehicle 3 is in a dead zone. In this case, the police officer 14 can identify themselves with the aid of the local physical interface 8. For this purpose, the police officer 14 can, for example, scan an authorized RFID tag or an optoelectronic code, input a predetermined sequence of numbers and/or letters into the local physical interface 8, and/or transmit a wireless authentication signal to the local physical interface 8, for example by transmitting a signal transmitted via an NFC, Wi-Fi, Bluetooth and/or infrared interface. The police officer 14 can use, for example, a mobile device such as a smartphone, a smartwatch, a tablet computer and/or a laptop for this purpose.

FIG. 3 shows a schematic depiction of a theft prevention system 11 according to the invention. Here, as already mentioned, sensor data 15 generated by one or more sensors 9 are sent directly (symbolized by a dotted line) via the wireless communication interface 7 or indirectly (symbolized by a solid line) via the authorization unit 4 to the control center 10. The wireless communication can be effected using any proven communication technology, for example via mobile telephony such as 4G or 5G. The control center 10 is designed in particular as a vehicle control center.

Depending on a current situation, the control center 10 decides whether it is necessary to release the trailer 3.2 from the tractor unit 3.1. If this is the case, the control center 10 forwards the initiation command 6 to the authorization unit 4, whereupon the latter forwards the control command 5 to the securing device 1 to release the vehicle coupling 2. It is thus not possible to release the vehicle coupling 2 until the securing device 1 has been released. The initiation command 6 can also be output from the local physical interface 8 to the authorization unit 4.

The theft prevention system 11 according to the invention can optionally have the operating device 12 and/or the display 13, which is indicated by a dashed line. For example, the display 13 can show a current state 16 of the vehicle coupling 2 and/or a state 17 of the securing device 1. In addition, the local physical interface 8 can have a display 13 for presenting information. The state 16 of the vehicle coupling 2 and/or the state 17 of the securing device 1 can also be output acoustically. For example, when the vehicle coupling 2 engages or disengages and/or when the securing device 1 is locked and/or released, a corresponding warning tone and/or a corresponding text message can be output via a loudspeaker. To monitor the state 17 of the securing device 1 and/or the state 16 of the vehicle coupling 2, the securing device 1 and/or the vehicle coupling 2 have corresponding sensors which are not shown.

The invention claimed is:

1. A method for locking and releasing a securing device (1) of a vehicle coupling (2) of a vehicle (3), comprising the steps of:
    switching the securing device (1) between a locked state and a released state by a control command (5) output by an authorization unit (4), wherein the authorization unit (4) outputs the control command (5) after the authorization unit (4) has received an initiation command (6) which was transmitted to the authorization unit (4) by an interface and wherein a wireless communication interface (7) and a local physical interface (8) are useable as the interface;
    transmitting sensor data (15), generated by at least one sensor (9) of sensors (9) that monitor surroundings of the vehicle (3), via the wireless communication interface (7) to a control center (10); and
    transmitting the initiation command (6) to the vehicle (3) by the control center (10) via the wireless communication interface (7) as a function of the sensor data (15);
    wherein the vehicle (3) is controllable autonomously and wherein at least one camera and one microphone are used as the sensors (9);
    wherein when there is no communication connection between the control center (10) and the vehicle (3), it is only possible to output the initiation command (6) by way of the local physical interface (8).

2. The method according to claim 1, wherein the sensors (9) further include:
    a radar;
    a sensor for determining whereabouts of the vehicle (3);
    a lidar; and/or
    an ultrasound sensor.

3. The method according to claim 1, wherein the local physical interface (8) outputs the initiation command (6) when the local physical interface (8) detects at least one of the following authorized actions:
    reading an authorized RFID tag;
    reading an authorized optoelectronic code;
    scanning an authorized biometric feature;
    inputting an authorized sequence of numbers and/or letters into an input device of the local physical interface (8); and/or
    receiving a wireless signal that is a transmitted via NFC, Wi-Fi, Bluetooth and/or infrared.

4. The method according to claim 1, further comprising the step of transmitting a state of the securing device (1) to the control center (10) at a predetermined point in time.

5. The method according to claim 1, wherein the control center (10) is a vehicle control center for controlling an autonomous lorry.

6. A theft prevention system (11) for preventing an unauthorized removal of a trailer (12) connected via a vehicle coupling (2) to an autonomously controllable vehicle (3), comprising:
- a securing unit (1);
- an authorization unit (4);
- at least one sensor (9); and
- an interface;
- wherein a wireless communication interface (7) and a local physical interface (8) are useable as the interface;
- wherein at least one camera and one microphone are used as the at least one sensor (9);
- wherein the authorization unit (4) is configured to implement the method according to claim 1.

7. A vehicle (3), comprising:
- the theft prevention system (11) according to claim 6;
- wherein the vehicle (3) has an autonomous mode of operation.

8. The vehicle (3) according to claim 7, wherein the vehicle (3) is a tractor unit.

9. The vehicle (3) according to claim 7, wherein the vehicle (3) is a lorry.

10. The vehicle (3) according to claim 7, wherein the vehicle (3) is autonomously controllable by a vehicle control center.

\* \* \* \* \*